W. A. TURBAYNE.
ELECTRICAL SYSTEM OF DISTRIBUTION.
APPLICATION FILED AUG. 25, 1906. RENEWED APR. 9, 1909.
963,339.
Patented July 5, 1910.
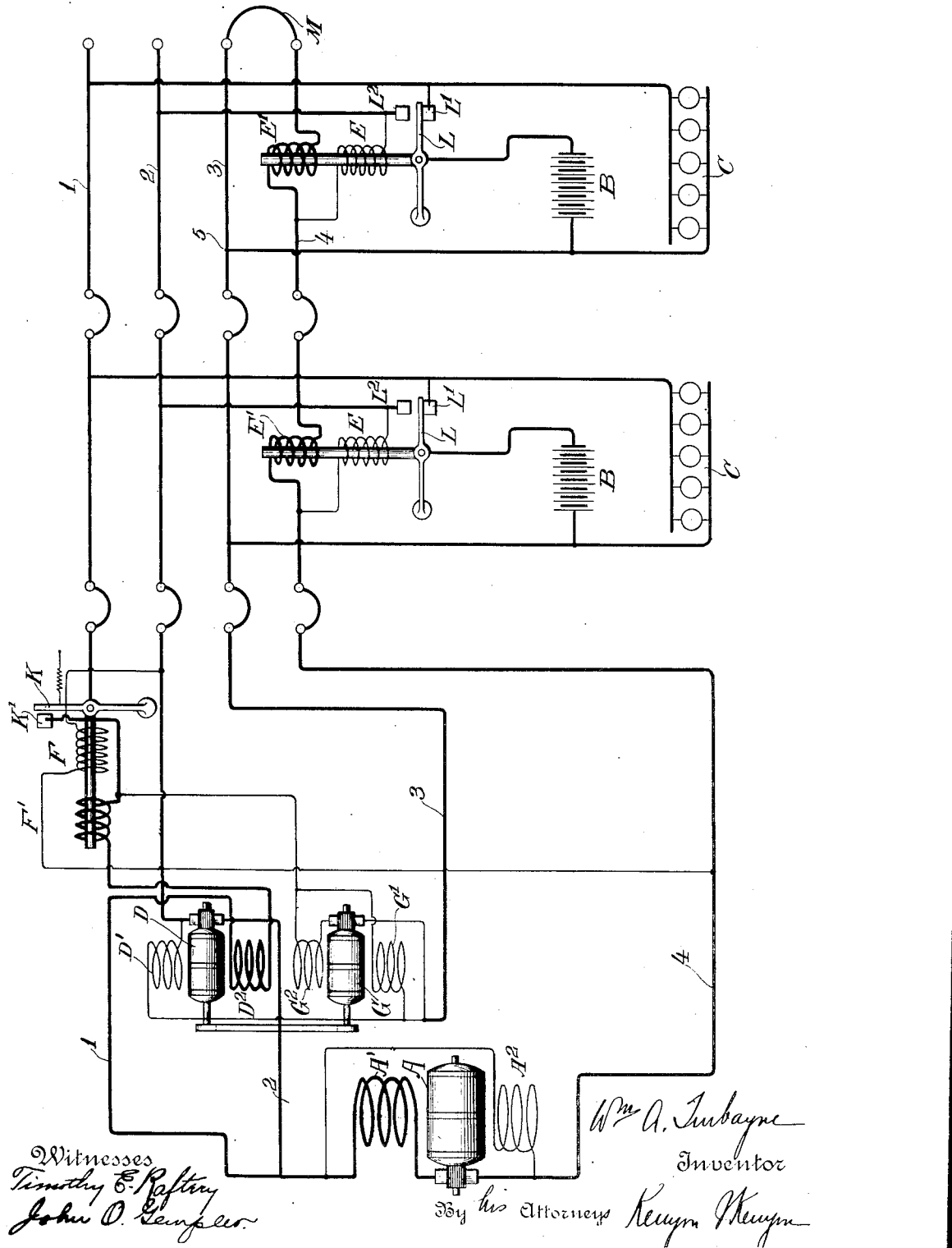

UNITED STATES PATENT OFFICE.

WILLIAM A. TURBAYNE, OF LANCASTER, NEW YORK, ASSIGNOR TO GOULD STORAGE BATTERY COMPANY, A CORPORATION OF NEW YORK.

ELECTRICAL SYSTEM OF DISTRIBUTION.

963,339.      Specification of Letters Patent.      Patented July 5, 1910.

Application filed August 25, 1906, Serial No. 331,952. Renewed April 9, 1909. Serial No. 488,976.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and has been especially devised for train lighting systems in which generating and regulating apparatus is provided in one of the train units, say the baggage car, and on each car to be lighted a battery is provided to supply the lamps of its car when the generating plant is disconnected. Such a system is described in the patent to Chamberlain No. 771,710 of October 4, 1904.

It is the object of my invention to improve on the general system of that patent in order to simplify the same and make it more efficient and certain in operation.

To these ends my invention includes various improvements in construction, arrangement and connection of the system as will more clearly appear in the course of the following description.

The drawing accompanying this specification is a diagram illustrating a specific embodiment of my invention in connection with a train lighting system in which a generating plant is shown on one car and two other cars are to be lighted.

A is the main generator of the system and it is illustrated as a compound wound generator having a series coil $A'$ and a shunt coil $A^2$. This generator may be driven by any suitable prime mover as, for example, by a steam engine supplied by steam from the boiler of the locomotive.

B represents the storage batteries in the various cars to be lighted and C represents the corresponding work circuits containing the lamps of the car. When the switches of the system are in the position shown each battery is feeding its respective work circuit without assistance from the generator, one terminal of the battery being directly connected to one terminal of the work circuit, and the other terminal of the battery being connected through the switch lever $L$ and the contact $L'$ to the other terminal of its work circuit.

From one pole of the generator is led a conductor 1 which extends throughout the train. This conductor is connected in each car to the said switch contact $L'$ and therefore to one side of the working circuit. From the same terminal of the generator a conductor 2 is led which also extends from car to car of the train, this conductor forming one side of the charging circuit. It is connected in each car to the contact $L^2$ with which the switch lever $L$ is adapted to engage when it is lifted from engagement with the contact $L'$. Contained in this conductor 2 of the charging circuit is the booster armature D which has one field winding $D'$ subjected to the voltage of the charging circuit and one field winding $D^2$ in series in the work circuit, the windings $D'$ and $D^2$ being opposed to each other, so that as more current is developed in the work circuit the voltage added to the generator A by the booster armature D will be reduced, thus reducing the voltage of the charging circuit, and consequently the current in the charging circuit.

From the other terminal of the generator A there is led a conductor 4 which extends throughout the train, being connected at the end of the train by a loop M to a conductor 3 to which one terminal of each battery and work circuit is connected.

When the generating apparatus is in use the switch levers L are engaging contacts $L^2$ and the switch lever K, hereinafter described, is engaging the contact $K'$. Under these circumstances it will be seen that each work circuit is directly connected to the generator across conductors 1 and 3, the return current from the work circuit to the generator passing through the conductors 3 and 4 and thence to the generator. The battery is not connected to the work circuit but is instead connected between conductors 2 and 3 and therefore is subjected to the electro-motive force of the charging circuit, being the sum of the electro-motive forces of the generator and the booster D. The return current from the charging circuit must also pass to the conductor 3 around the connector M and back through the return conductor 4 to the generator. The idea of forming the return side of the circuit as a loop comprising the conductors 3 and 4 is primarily to enable an equal voltage to be developed at each car.

Each switch lever L is acted upon by two coils E and E'. The coil E is a voltage coil responsive to the voltage of the charging circuit, each coil E being connected in an independent shunt in its car between the conductor 2 and the loop conductor 3, 4. The coils E' are current coils and are connected in series in the conductor 4 in order that they will be in the return portion of the loop, that is, the portion in which the total generator current is flowing. This return portion of the loop in the present instance includes all of conductor 4 and that portion of the conductor 3 to the right of the junction point 5.

When the voltage of the charging circuit has risen to a predetermined point the magnetism developed by the coils E raises the switch lever L and places the battery on the charging circuit. The current in each coil E' develops magnetism that assists in holding up its switch lever L. Should, however, there be a reverse current developed, because of abnormal increase of battery voltage or decrease of generator voltage, the current from the battery tending to run the generator as a motor would pass through the coils E' in the opposite direction returning to the battery by the conductor 3. Under these circumstances the magnetism developed by the coils E' would oppose the magnetism developed by the coils E and cause the switch lever L to drop closing each battery on its work circuit. The coils E', being connected in series in the same portion of the circuit of the generator, are always subjected to exactly similar conditions and therefore all the batteries on the train will be disconnected from the charging circuit simultaneously if a reverse current develops.

The switch K is provided to automatically disconnect the work circuits from the generator when there in a reverse current. Thus after the switches L have acted as just described to close each battery upon its work circuit, the battery would still tend to send current back through the line 1 to the generator to operate the same as a motor. This is prevented because the switch lever K is actuated by a voltage coil F connected across the charging circuit and is also controlled by a current coil F' located in the conductor 1, and, therefore, responsive to current changes of the circuit including the generator and work circuits. If current passes through this conductor 1 in the reverse direction, namely, from the battery to the generator, then the magnetic fluxes produced by the coils F and F' are opposed and switch lever K opens.

In order to rotate the booster I have provided an electric motor whose armature is represented at G. This motor has a shunt field winding G' and a cumulative series field winding $G^2$. This series field winding enables the operator to start up the whole system smoothly without shock by merely turning steam into the engine driving the main generator, as the starting current in the series field of the motor checks the acceleration of the motor and the passage of excessive current therethrough. Moreover, this series field winding has another valuable function. When the voltage of the battery is unusually low, thus tending to cause a heavy charging current, the load upon the booster necessarily increases, calling for greater current in the motor armature. This greater current passing through the field $G^2$, reduces the speed of the motor, and therefore, the voltage of the booster, thus limiting the charging voltage. The coil, $G_2$, therefore, automatically regulates for changes of battery voltage.

It is sometimes the case that the voltage across the charging circuit will be sufficient to raise the switch levers L thus connecting the batteries to the charging circuit, and yet the electro-motive force of the battery may be sufficiently high so that when the switches L are raised the motor G will be operated partly or wholly from the battery. This will often be the case upon starting the apparatus before the booster has developed its full voltage. Under these circumstances the current from the battery would flow back through conductor 2 through the booster and then through conductor 1 to the motor. It is desirable that such a current shall not act in the same way as reverse current flowing to the generator to cause the switch levers L to drop. On the contrary, it is desirable that while this condition is present the switches L shall be in their upper position. In order to accomplish this result I have connected the return side of the motor G to the outgoing conductor 3 of the loop instead of connecting the motor to the conductor 4, or directly to the return side of the armature A. Except for this it would not be necessary to extend the conductor 3 into the car containing the generating apparatus. With the connections as shown, therefore, any current from the batteries, or either of them, to the motor, to operate the motor, would in passing from the motor pass directly from the conductor 3 to the battery, completing the circuit without passing through the coils E'.

It will be understood that the various coils to which I have referred for operating the switches may be electro-responsive devices of any kind adapted to be affected by the changing conditions of a circuit and thereby to operate a switch lever, and that in using the term coils in the claims I have such a meaning in mind.

It will also be understood that the various details shown and described may be largely modified without departing from the scope of the appended claims.

I have shown a dynamo as the booster and I prefer to use a dynamo for this purpose but I do not intend to limit myself to any special kind of boosting apparatus.

Having thus described my invention what I claim as new and desire to secure by Letters Patent is:—

1. The combination of a generator, a plurality of batteries, a plurality of work circuits, a common charging circuit from the generator to the various batteries, a switch for each battery arranged to connect said battery either to a work circuit or to the charging circuit, and coils control'ing each of said switches, one coil for each switch being a voltage coil and another coil for each switch being a current coil, the current coils being in series in the same circuit.

2. The combination of a generator, a plurality of batteries, a plurality of work circuits, a common charging circuit from the generator to the various batteries, a switch for each battery arranged to connect said battery either to a work circuit or to the charging circuit, and coils controlling each of said switches, one coil for each switch being a voltage coil and another coil for each switch being a current coil, the current coils being in series in the charging circuit.

3. The combination of a generator, a plurality of batteries, a plurality of work circuits, a common charging circuit from the generator to the various batteries, a switch for each battery arranged to connect said battery either to a work circuit or to the charging circuit, a circuit independent of said switches and containing the generator and the various work circuits and coils automatically acting upon the various switches connected in series in the main common to said independent circuit and said charging circuit.

4. The combination of a generator, a plurality of batteries, a plurality of work circuits, a common charging circuit from the generator to the various batteries, a switch for each battery arranged to connect said battery either to a work circuit or to the charging circuit, a circuit independent of said switches and containing the generator and the various work circuits, and two coils governing each of said switches, one coil of each switch being connected across the charging circuit and the other coils being connected in series in the main common to said independent circuit and said charging circuit.

5. The combination of a generator, a booster, a motor for operating the booster, a plurality of batteries and work circuits, a conductor from one pole of the generator connected to the various work circuits, a second conductor from the same pole of the generator containing the booster, a third conductor connected to the other pole of the generator and to the batteries and work circuits and to the motor, the motor being connected to the opposite end of said conductor from that to which the generator is connected, a switch arranged to connect each battery either with a work circuit terminal or with said second conductor, and coils affecting the action of said switches connected in series in said third conductor between its connection to the generator and its connection to the batteries.

6. The combination of a generator, a booster, a motor for operating the booster, a battery, a work circuit, a conductor from one pole of the generator connected to the work circuit, a second conductor from the same pole of the generator containing the booster, a third conductor connected to the other pole of the generator and to the battery and work circuit and the battery and work circuit connections being between the generator and motor connections to said conductor to the motor, a switch arranged to connect the battery either with the work circuit or with the second conductor and a coil affecting the action of said switch and connected in the third conductor between its connections to the generator and its connections to the battery.

7. In an electrical distribution system, a generating and regulating plant comprising a generator, a booster, and a motor driving the same, batteries and work circuits on different cars of the train, four conductors extending from the generating plant to said cars, one connecting a terminal of the generator directly with the various work circuits, the second extending from the same terminal of the generator to the booster and then to a terminal in each car, the third connecting the motor and the work circuits, the fourth connecting the other terminal of the generator with the outer end of the third conductor, and a switch on each car arranged to connect the battery either with the work circuit or with the terminal of the second conductor.

8. In an electrical distribution system, a generating and regulating plant comprising a generator, a booster and a motor driving the same, batteries and work circuits on different cars of the train, four conductors extending from the generating plant to said cars, one connecting a terminal of the generator directly with the various work circuits, the second extending from the same terminal of the generator to the booster and then to a terminal in each car, the third connecting the motor and the work circuits, the fourth connecting the other terminal of the generator with the outer end of the third conductor, a switch on each car arranged to connect the battery either with the work circuit or with the terminal of the second conductor, and coils included in series in the loop formed by said third and fourth conductors each affecting the action of one of said switches.

9. In an electrical distribution system, a generating and regulating plant comprising a generator, a booster, and a motor driving the same, batteries and work circuits on different cars of the train, four conductors extending from the generating plant to said cars, one connecting a terminal of the generator directly with the various work circuits, the second extending from the same terminal of the generator to the booster and then to a terminal in each car, the third connecting the motor and the work circuits, the fourth connecting the other terminal of the generator with the outer end of the third conductor, a switch on each car arranged to connect the battery either with the work circuit or with the terminal of the second conductor, and two coils for governing each of said switches, one of said coils being connected between the second and loop conductors, and the other of said coils being in the loop formed by the third and fourth conductors.

10. The combination of a generator, a battery, a work circuit, a charging circuit, a booster therein, an independent circuit from the generator to the work circuit, and a motor for driving the booster having series and shunt field windings.

11. The combination of a generator, a battery, a work circuit, a charging circuit, a booster therein, an independent circuit from the generator to the work circuit, and a motor for driving the booster having series and shunt field windings and connected to said independent circuit.

12. The combination of a generator, a plurality of batteries and work circuits, a charging circuit, a booster therein, an independent circuit from the generator to the work circuits, and a motor for driving the booster having series and shunt field windings.

13. The combination of a generator, a plurality of batteries and work circuits, a charging circuit, a booster therein, an independent circuit from the generator to the work circuits, and a motor for driving the booster having series and shunt field windings and connected to said independent circuit.

14. The combination of a generator, a charging circuit and a booster therein, a battery and a work circuit, a switch for connecting the battery either to the work circuit or to the charging circuit, means for actuating said switch by current from the battery to the generator, an independent circuit from the generator to the work circuit, a switch in said independent circuit, and means for actuating said last mentioned switch by current from the battery to the generator.

15. The combination of a generator, a charging circuit and a booster therein, a battery and a work circuit, a switch for connecting the battery either to the work circuit or to the charging circuit, means for actuating said switch by current from the battery to the generator, an independent circuit from the generator to the work circuit, a switch in said independent circuit, and means arranged to actuate said last mentioned switch after said first mentioned switch has been actuated when energy is transmitted from the battery to the generator.

16. A generator, a battery, a booster, a motor for actuating the booster, a work circuit, a switch arranged to connect the battery either to the work circuit or to a circuit including the booster, a conductor connected in the order named to like poles of the generator, the battery and the motor, and a coil acting upon said switch and connected in said conductor between the battery and generator connections.

17. The combination of a generator, a charging circuit and a booster therein, a battery and a work circuit, a switch for connecting the battery either to the work circuit or to the charging circuit, an independent circuit from the generator to the work circuit, a switch in said independent circuit, means for actuating said battery switch by current from the battery to the generator in the charging circuit, and means for actuating the switch in the independent circuit by current in that circuit from battery to generator.

18. The combination of a generator, a charging circuit, a plurality of batteries and work circuits, a corresponding plurality of switches each arranged to connect a battery with a work circuit, an independent circuit connecting the work circuits with the generator, a switch therein, means for simultaneously opening the various battery switches by reverse current from the battery, and means for opening the said switch by such reverse current.

19. The combination of a generator, a plurality of batteries, a plurality of work circuits, a common charging circuit, a switch for each battery arranged to connect said battery either to a work circuit or to the charging circuit, coils connected to receive the total battery and work currents and voltage coils automatically acting upon the various switches.

20. The combination of a generator, a charging main, a booster therein, a battery, a work main, a switch for connecting the battery either to the charging main or to the work main, a third main connecting the generator to the batteries and a coil directly acting upon said switch and located in the third main and adapted to receive the sum of the battery and work currents, and a coil connected to the charging main and said third main.

21. The combination of a generator, a plurality of batteries and work circuits, a charging circuit, a switch for each work circuit and battery, arranged to connect the battery to the charging circuit and operated upon by a voltage coil and a governing coil for each switch, said governing coils being in series with each other.

22. The combination of a generator, a plurality of batteries, a plurality of work circuits connected to one pole of the generator, a conductor connecting the other pole of the generator with the batteries and work circuits, a switch for each battery and adapted to automatically connect and disconnect said battery to its work circuit, and coils governing the action of the switches in series in said conductor.

23. The combination of a generator, batteries, work circuits, a switch for connecting each work circuit to its battery, a conductor connecting the various work circuits with the generator, and coils acting upon the various switches, in series in said conductor.

24. In a system of electrical distribution for trains, a generating station on one of the train units, batteries and work circuits on other train units, two conductors leading from the generator to the various train units and adapted to have different potentials, a loop return conductor extending through the various train units, switches on the various train units determining the connection of the various batteries and work circuits, said switches being arranged to be acted upon by coils in said loop conductor.

25. In a system of electrical distribution for trains, a generator on one train unit, batteries and work circuits on other train units, conductors leading through the train from the generator, one of said conductors being a loop, a switch for each battery and work circuit, and coils acting upon said switches connected in said loop conductor.

26. In an electrical system of distribution, a plurality of train units, a storage apparatus and work circuit on each unit, a charging conductor extending through the various train units, a work circuit conductor extending through the various train units, return means therefor, a switch on each unit for determining the connections between the work circuit, storage apparatus and conductors, said switch being operated upon by a coil responsive to the total currents from the batteries and work circuits.

27. In an electrical train lighting system, a plurality of train units, a battery and work circuit on each unit, a charging conductor extending through the various units, a work circuit conductor extending through the various units, a switch on each unit for determining the connections between work circuit, battery and conductors thereof, a coil for regulating the operation of said switch, said coil being connected to the charging conductor so as to be responsive to variations in the charging voltage, and a second coil for regulating the operation of said switch responsive to current variations of the system as distinguished from voltage variations.

28. In an electrical train lighting system, a plurality of train units, a battery and work circuit on each unit, a charging conductor extending through the various units, a work circuit conductor extending through the various units, a switch on each unit for determining the connections between work circuit, battery and conductors thereof by connecting the battery either with the work circuit or charging conductor, a coil for regulating the operation of said switch, said coil being connected to the charging conductor so as to be responsive to variations in the charging voltage, and a second coil for regulating the operation of said switch responsive to current changes of the system as distinguished from voltage variations.

29. In an electrical train lighting system, a plurality of train units, a battery and work circuit on each unit, a charging conductor extending through the various units, a work circuit conductor extending through the various units, a switch on each unit for determining the connections between work circuit, battery and conductors thereof, a coil for regulating the operation of said switch, said coil being connected to the charging conductor so as to be responsive to variations in the charging voltage, and a second coil for regulating the operation of said switch, said second coil being arranged to carry a current which varies in direction responsive to changes in the direction of the battery current.

30. In an electrical system of distribution, a source of electrical energy, a plurality of train units, a work circuit and battery on each unit, a charging conductor extending through the various train units for conveying the charging current to the batteries, a consumption conductor extending through the various train units for conveying current from the source to the various work circuits, a return loop conductor for completing the circuits to the source, a switch on each unit for connecting the battery neither to the consumption circuit or to the charging circuit, a coil for regulating the operation of said switch, said coil being connected to the charging conductor so as to be responsive to variations in the charging voltage, and a second coil for regulating the operation of said switch, said second coil being arranged to carry a current responsive to changes in the direction of the battery current and tending to operate said switch to disconnect the battery from the charging circuit when the battery discharges.

In testimony whereof, I have signed my name to this specification, in the presence of two subscribing witnesses.

WILLIAM A. TURBAYNE.

Witnesses:
W. D. CARTER,
T. N. PATTERSON.